United States Patent

[11] 3,619,391

[72] Inventor Steve Eisner
  Schenectady, N.Y.
[21] Appl. No. 882,104
[22] Filed Dec. 4, 1969
[45] Patented Nov. 9, 1971
[73] Assignee Norton Company
  Troy, N.Y.

[54] ELECTROCHEMICAL TREATMENT OF LIQUIDS
  5 Claims, 3 Drawing Figs.
[52] U.S. Cl.................................................. 204/149,
  204/130, 204/202
[51] Int. Cl..................................................... C02b 1/82
[50] Field of Search............................................ 204/149,
  194, 198, 199, 202, 206, 130

[56] References Cited
UNITED STATES PATENTS

| | | | |
|---|---|---|---|
| 1,029,965 | 6/1912 | Aylsworth..................... | 204/199 |
| 1,146,942 | 7/1915 | Landreth....................... | 204/149 |
| 1,721,949 | 7/1929 | Edelman....................... | 204/224 |
| 1,974,441 | 9/1934 | Andersen...................... | 204/11 |
| 2,698,832 | 1/1955 | Swanson....................... | 204/224 |
| 2,997,437 | 8/1961 | Whitaker....................... | 204/209 |
| 3,022,232 | 2/1962 | Bailey et al.................... | 204/36 |
| 3,334,041 | 8/1967 | Dyer et al...................... | 204/284 |
| 3,377,264 | 4/1968 | Duke et al..................... | 204/290 |
| 3,479,281 | 11/1969 | Kikindai et al................. | 204/149 X |
| 3,523,891 | 8/1970 | Mehl.............................. | 204/149 X |

Primary Examiner—John H. Mack
Assistant Examiner—A. C. Prescott
Attorneys—Hugh E. Smith and Herbert L. Gatewood ABSTRACT: This invention relates to improvements in apparatus and methods for electrochemically treating industrial waste water and other polluted water such as sewage. The invention also relates to the electrochemical treating of noncontaminated liquids whereby chemically active materials are synthesized and dispersed into the liquid by electrochemical action. In addition to the conventional electrodes, there is provided a nonconductive, hard particle activating and abrading means which contacts the surface of the electrodes so as to activate the electrode surface, to remove any films adhering to the electrodes, to dislodge gas bubbles and to disperse by mechanical means any viscous liquid or solid layer of sludge which tends to form near the electrodes. The present improvement allows the use of very high current densities whereby the efficiency of the system is markedly improved, and the efficiency does not deteriorate during the process.

PATENTED NOV 9 1971   3,619,391
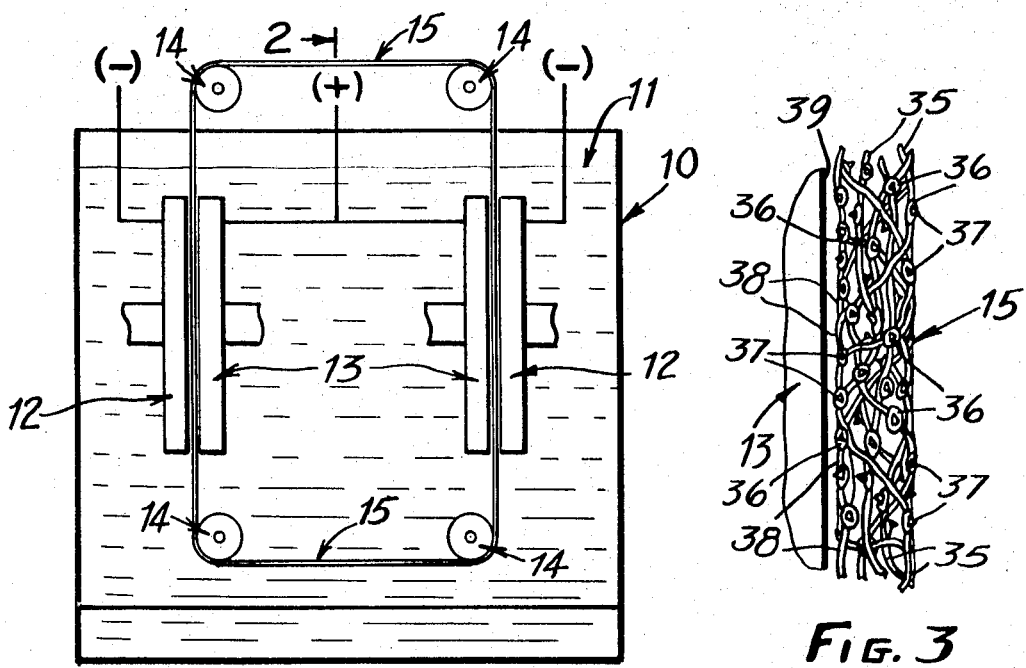
Fig.1
Fig.3
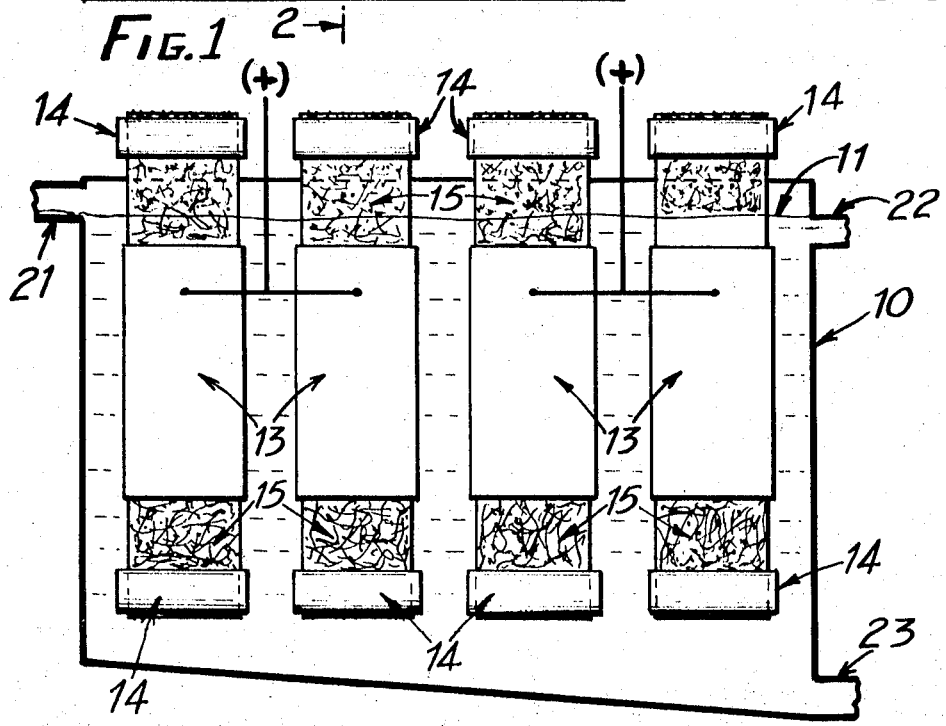
Fig.2
INVENTOR
STEVE EISNER
BY Hugh E. Smith
ATTORNEY 3,619,391

ELECTROCHEMICAL TREATMENT OF LIQUIDS

FIELD OF INVENTION

Electrochemical methods have long been known to be effective in treating a contaminated liquid, such as water, to purify or sterilize the liquid. Electrochemical treating of noncontaminated liquids has also been disclosed where chemically active materials are synthesized and dispersed into the liquid. The liquid is then useful for medicinal and analogous uses.

In the case of treating industrial effluent and sewage, electrochemical methods have been used to oxidize the sugars, starches, sulfites and other organic constituents in the effluent. Such a method is shown in U.S. Pat. No. 943,183. This patent also discloses that the electrodes must be kept clean to develop their maximum efficiency. The principal difficulty in purifying water by an electric current arises from the deposit of impurities contained in the water on the electrodes or plates due to the electrolytic action of the electric current on the water. This deposit soon creates such resistance to the flow of electric current that organic material can no longer be oxidized and removed from the water. U.S. Pat. No. 943,183, mentioned above, utilizes periodic reverse currents to loosen the deposits formed so that they can be flushed away by the liquid being treated.

An improved apparatus for electrically treating water is demonstrated in U.S. Pat. No. 2,530,524, wherein the electrode is rotated by the water passing through the apparatus and is cleaned by rubbing contact with stationary rubber wipers. However, even with the wiping system, the deposit of impurities on the electrodes was not eliminated.

A method of electrochemically treating water for drinking and industrial use is disclosed in U.S. Pat. No. 1,095,893 wherein paddles are rotated to come in contact with the electrode to keep the electrode free of bubbles and other matter deposited from the water, and to thoroughly agitate the water or liquid being treated.

A process for treating waste cyanide plating solutions is demonstrated in U.S. Pat. No. 2,520,703. The waste cyanide material is treated by electrolyzing the heated solution to decompose the cyanide-bearing material and to plate the residual metal on the cathode. The speed of the decomposition reaction decreases as the process proceeds due to the depletion of cyanide and contaminants forming on the electrodes.

U.S. Pat. No. 1,514,737 demonstrates a method of treating noncontaminated liquid such as water to produce colloidal solutions which are useful for medicinal and analogous purposes. The liquid comes into contact with an electronegative material and an electropositive material. The electropositive material is of a corrodible character. Electrolytic action is set up between the electronegative and electropositive materials resulting in the formation of a colloidal material such as aluminum hydroxide. The electrochemical action has to be mild to reduce the amount of noncolloidal material being formed. The electropositive material utilized in U.S. Pat. No. 1,514,737 is in a subdivided form to present a very large superficial area to electrochemical action so that substantial amounts of colloidal substances are formed. The colloidal material tends to contaminate the subdivided electropositive material resulting in a decrease in efficiency and ultimate stopping of the process completely.

SUMMARY

The present invention is directed towards an improved process and apparatus for electrochemically treating liquids such as water. The liquid or water can be contaminated or polluted in which case the electrochemical action is directed to cleaning and purifying the liquid. The liquid or water can also be noncontaminated or potable in which case the electrochemical action is directed to synthesizing and dispersing chemically active materials into the liquid by electrochemical action.

The improvement comprise the addition of a system for activating and cleaning one or both electrodes wherein the electrode is continuously and repetitively contacted at extremely short time intervals by what is termed herein as "dynamically hard" particles. By this term is meant that the combination of the hardness of the particles, the contact pressure of the particles on the surface of the electrode and the speed at which such particles are moving relative to the electrode surface is such as to produce an action on such surface sufficient to mechanically "activate" the surface and to mechanically abrade any film or formation from the surface of the electrode.

"Activating" the surface of the electrode within the meaning of the present invention means the removal of any polarization layer and reaction product layer from the electrode surface and the disarrangement of the atoms in the metal layer of the electrode surface to a degree sufficient to cause increased activity. This process is fully described in my application, Ser. No. 718,468, filed Apr. 3, 1968, now abandoned, entitled "Electrodeposition" and the entire contents of such application are incorporated herein by reference. Even though my above-mentioned application relates to electrodeposition, the activation of the electrode surface and electrodeposit as well as the means for said activation is applicable to the present invention.

The activation of the electrode surface results in a remarkable increase in the rate of electrochemical action which allows a reduction in equipment size and an increase in production rates over the prior art methods mentioned earlier. The abrading action also eliminates one of the principal difficulties experienced in the prior art, that is the contamination of the electrode surfaces with impurities contained in the liquid being treated and products being formed at the electrode surface.

Where the process is directed to synthesis and dispersion of colloidal, chemically active material in the liquid due to electrochemical action, the abrading process permits the use of a solid corrodible electrode in place of the subdivided electrodes of the prior art. The abrading action reduces the formation of large particles and thereby increases the formation of desired colloidal particles. The increased activity of the electrode surface also increases the rate of formation of colloidal particles markedly over the rates obtained by prior art processes.

DRAWINGS

The present invention is explained hereinafter in greater detail by reference to the accompanying drawings which show the preferred embodiments of this invention. It should be understood, however, that the drawings and examples are given for purposes of illustration and that the invention in its broader aspects is not limited thereto.

In the drawings:

FIG. 1 is an end view of one preferred embodiment of apparatus employing this invention.

FIG. 2 is a side view of the apparatus of FIG. 1 taken along section 2—2 of FIG. 1.

FIG. 3 illustrates diagrammatically a portion of a cross section of one type of porous activating medium useful in the present invention.

DESCRIPTION OF PREFERRED EMBODIMENTS

Referring now to FIG. 1, the apparatus of a preferred embodiment of the present invention comprises a tank 10 fabricated of suitable material and filled to the level shown by numeral 11 with the liquid to be treated, such as water. In many cases the liquid being treated will have sufficient conductivity to act as an electrolyte in the electrochemical treatment. However, if the liquid to be treated does not have a sufficient conductivity, relatively harmless ionic salts may be added to increase the conductivity to a satisfactory value.

Also included in the apparatus of FIG. 1 are cathodes 13 anodes 12, a porous activating belt 15 and a pulley roller system 14. The cathodes and anodes are supplied by suitable means with a source of positive and negative electricity respectively. The pulley system 14 is equipped with suitable driving means, not shown, to enable the pulley system to drive the activating belt 15 in either a clockwise or counterclockwise direction. The cathodes and anodes are supported by suitable means, not shown, so that the activating means is positioned between the anodes and cathodes. The anodes and cathodes are forced towards each other to create a rubbing and mildly abrasive contact between the activating belt 15 and the cathodes 13 and anodes 12. The system can also be designed so that only the cathode 13 or the anode 12 alone is brought into contact with the activating belt 15.

A side view of the apparatus of FIG. 1 is shown in FIG. 2. As shown, several electrolytic systems comprising anodes 12, cathodes 13 and activating belts 15 can be arranged side by side in the same tank 10. In such an arrangement the liquid enters at one end 21. The tank 10 slopes down and away from the electrolytic systems to a discharge opening 23. In those operations where a precipitate is formed by the electrolytic action, such precipitate can be removed at the opening 23. The treated liquid leaves the tank 10 at opening 22.

FIG. 3 shows a highly enlarged and idealized portion of one type of activating media suitable for use in the present invention. Reference numeral 35 represents fibers of a nonwoven web (nonconducting fibers such as polyethylene terephthalate or the like) which are anchored one to the other at their points of intersection by an adhesive binder 36. A plurality of small, hard, discrete particles 37 are positioned on the fibers 35 and in the present illustration are held to such fibers by the adhesive 36. At least some of the fibers 35 extend relatively parallel to the cathode or anode face 39 as shown at 38 to form the thin-walled cells or electrolyte sweeping members which, as explained in my application, Ser. No. 718,468, mentioned earlier, provides fresh electrolyte constantly to the activated surface of the cathode or anode. (For purposes of illustration, the activating particles 37 are here shown at some distance from the cathode or anode face 39 although in operation of the present apparatus they would be in contact therewith.) The activating belt shown in FIG. 3 and described above is one preferred type activating belt. However, may other porous, hard particles containing matrixes can be used in place of the one shown in FIG. 3 and described above.

EXAMPLES

Examples I

Using apparatus similar to that shown in FIG. 1, the waste plating solution from a cyanide type electroplating bath can be treated to remove the cyanide and metal ion constituents.

The process is similar to that described in U.S. Pat. No. 2,520,703. The waste material from the cyanide plating bath is charged to the treating tank. The process is of a batch type and, therefore, there is no continuous feeding of liquid to the tank or continuous drawing of treated liquid from the tank. The solution in the tank is heated by a steam coil or other suitable means to a temperature of about 200° F. and a voltage of about 13 volts is applied across the anodes and cathodes which can be made of steel or other metals. The activating belt, a nonwoven web of polyester fibers bonded with an acrylonitrile-melamine resin adhesive and roll coated with a phenolic adhesive and abrasive grain as described in my application, Ser. No. 718,468, mentioned earlier, is rotated at a linear speed of approximately 1000 feet per minute relative to the electrodes. The anodes and cathodes are situated such that the activating belt contacts them under a relative pressure of approximately 2 to 4 pounds per square inch.

The present system plates out the metal ion on the cathode and electrochemically decomposes the cyanide constituent. The time required to reduce the cyanide to approximately 4 parts per million is several hours which compares to several days for the prior art process as mention above.

Example II

Again, using apparatus similar to that shown in FIG. 1, raw water from ordinary water sources or from waste water from factories or from sewage can be treated to reduce the contamination due to organic and other impurities. The raw water is treated to produce potable water for drinking purposes, or, as is usual with respect to industrial waste water and sewage, the treatment is intended to lower the biological oxygen demand of the water to a level where the water can be discharged to natural bodies of water such as rivers and lakes.

The raw water can be introduced into tank 10 of FIG. 1 through the opening 21. In this instance the tank and electrochemical treating means are situated and operated as in example I, with the exception that raw water is continuously fed to the tank 10 through opening 21 and treated water is withdrawn continuously through opening 22.

Suitable electrodes formed of aluminum can be used so that aluminum hydroxide is formed by the electrochemical reaction. The aluminum hydroxide is flocculent and coagulates particles of impurities in the treated water. Other coagulants can be used to aid the coagulation of impurities and, as demonstrated in U.S. Pat No. 3,414,497 chemicals such as CaF which can be decomposed by the electrode potential may be added to the bath.

If the coagulants which form are such as to readily separate by falling to the bottom of the tank, clear treated water can be drawn from the top of tank 10 through opening 22 and the coagulants withdrawn from the bottom of tank 10 through opening 23. If the flocculent material does not readily separate, then the water drawn from the top of tank 10 through opening 22 will require filtration to remove such flocculent material.

Example III

The apparatus of FIG. 1 can be used to sterilize liquids by means of oligodynamy similar to the process demonstrated in U.S. Pat. No. 2,046,467.

The liquid to be treated is introduced through opening 21 and treated liquid is withdrawn at opening 22. The electrochemical treating means are situated and operated as in example I, with the exception that the process is continuous and the electrode must be made of an oligodynamically active metal.

The apparatus of this invention provides for a much faster rate of solution of the oligodynamically active metal due to the abrasive action of the activating belt which activates the surface of the electrodes and keeps the electrodes clean.

Example IV

The apparatus of FIG. 1 can be used to treat liquids which are not polluted or contaminated for the purpose of making colloidal solutions which can be used for medicinal and analogous purposes. A similar process is demonstrated in U.S. Pat. No. 1,514,737.

The liquid to be treated is introduced into tank 10 through opening 21 and the treated solution is withdrawn through opening 22. The electrochemical treating apparatus is situated and operated as in example I, with the exception that the process is continuous and that the electrodes used must be of a metal such as aluminum, magnesium, iron or copper which reacts under the electropotential to form a colloidal hydroxide useful as a medicinal agent.

The present process increases markedly the rate of formation of colloidal material, prevents formation of larger particles of hydroxide than desired, and prevents the contamination of the electrodes being used. While preferred embodiments of the invention have been described in the drawings and examples given above, other modifications and variations are undoubtedly possible, and the scope of this invention is to be defined only by the appended claims.

I claim:
1. A process for electrochemically treating a liquid which comprises:
   a. Bringing said liquid into contact with metallic electrodes,
   b. Passing an electric current between said electrodes and through said liquid,
   c. Simultaneously mechanically activating the surface of the electrode with a plurality of small particles supported by a liquid-permeable, fibrous matrix to increase the rate of electrochemical action thereon.

2. A process as in claim 1 wherein the positive electrode is a corrodible metallic material whereby colloidal substances containing metallic hydroxide are produced.

3. A process as in claim 1 wherein a compound is added to the liquid between the electrodes, the said compound decomposes due to the electropotential applied across the electrodes and the decomposition products react with organic and inorganic substances in the liquid.

4. A process as in claim 1 in which the positive electrode comprises a metal capable of forming hydrides.

5. A process as in claim 1 in which the liquid treated is an aqueous solution of waste cyanide material at a temperature of about 200° F.

* * * * *